(12) United States Patent
Song

(10) Patent No.: US 6,712,382 B2
(45) Date of Patent: Mar. 30, 2004

(54) BABY CARRIER

(75) Inventor: Zhenghuan Song, Kunshan (CN)

(73) Assignee: Goodbaby Group Corp (CN)

( * ) Notice: Subject to any disclaimer, the term of this patent is extended or adjusted under 35 U.S.C. 154(b) by 51 days.

(21) Appl. No.: 10/169,651

(22) PCT Filed: Jan. 3, 2001

(86) PCT No.: PCT/CN01/00002

§ 371 (c)(1), (2), (4) Date: Jul. 1, 2002

(87) PCT Pub. No.: WO01/49552

PCT Pub. Date: Jul. 12, 2001

(65) Prior Publication Data

US 2002/0195797 A1 Dec. 26, 2002

(30) Foreign Application Priority Data

Jan. 30, 2000 (CN) ........................ 00216025 U

(51) Int. Cl.$^7$ ................................. B62B 11/00
(52) U.S. Cl. ............. 280/642; 280/42; 280/649; 280/647; 280/650; 280/639; 280/47.38
(58) Field of Search .......... 280/642, 42, 649, 280/650, 647, 648, 644, 643, 657, 658, 641, 38, 639, 638, 47.38

(56) References Cited

U.S. PATENT DOCUMENTS

| 1,765,786 | A | * | 6/1930 | Brown | 280/643 |
|---|---|---|---|---|---|
| 2,951,708 | A | * | 9/1960 | Kujala | 280/642 |
| 3,653,681 | A | * | 4/1972 | Virtue | 280/642 |
| 4,256,325 | A | * | 3/1981 | Fleischer | 280/649 |
| 4,324,410 | A | * | 4/1982 | Perego | 280/42 |
| 4,335,900 | A | * | 6/1982 | Fleischer | 280/649 |
| 4,542,916 | A | * | 9/1985 | Kassai | 280/642 |
| 4,848,787 | A | * | 7/1989 | Kassai | 280/642 |
| 5,203,577 | A | * | 4/1993 | Kato et al. | 280/30 |
| 5,553,885 | A | * | 9/1996 | Chang | 280/642 |
| 5,938,230 | A | * | 8/1999 | Huang et al. | 280/650 |
| 6,276,709 | B1 | * | 8/2001 | Chen et al. | 280/650 |
| 6,375,213 | B1 | * | 4/2002 | Suzuki | 280/649 |
| 6,416,076 | B1 | * | 7/2002 | Hou et al. | 280/642 |
| 6,443,479 | B2 | * | 9/2002 | Huang | 280/642 |
| 6,581,957 | B1 | * | 6/2003 | Lan | 280/642 |
| 6,626,451 | B1 | * | 9/2003 | Song | 280/642 |

FOREIGN PATENT DOCUMENTS

JP 0481452 A1 * 4/1992 ............ B62B/9/12

* cited by examiner

Primary Examiner—Brian L. Johnson
Assistant Examiner—J. Allen Shriver
(74) Attorney, Agent, or Firm—Procopio Cory Hargreaves and Savitch

(57) ABSTRACT

A baby pushchair according to the present invention comprises a left handle bar and right handle bar; a left side bracket and right side bracket arranged symmetrically, each of which includes a front leg with a front wheel mounted at the lower end thereof and a rear leg with a rear wheel at the lower end thereof; a seat arranged between the left and right side bracket; a left armrest and right armrest, each front end of which is connected pivotally to the upper part of the left rear leg and the right rear leg respectively and each rear end of which is connected to the left handle bar and the right handle bar respectively; wherein the left/right front leg and the left/right rear leg crosses and connects pivotally to each other at the crossing part, and the left/right handle bars is connected pivotally with the upper part of the left/right front legs.

3 Claims, 4 Drawing Sheets

BABY CARRIER

FIELD OF THE INVENTION

The present invention relates to a baby pushchair.

BACKGROUND OF THE INVENTION

In the prior art, the structure of a conventional baby pushchair comprises a frame, front wheels and rear wheels mounted under the frame and a handle bar connected with the frame. The conventional pushchair is in a foldaway state when it is being transported or in storage, however, because the front wheels of the folded baby pushchair are either higher or lower than the rear wheels, the wheels can not stand side by side to support the whole pushchair. So it is inconvenient to use.

SUMMARY OF THE INVENTION

An object of the present invention is to provide a baby pushchair, of which the front wheels and the rear wheels can stand side by side to form a support to the whole pushchair.

A baby pushchair according to the present invention comprises:

- a left handle bar and right handle bar;
- a left side bracket and right side bracket arranged symmetrically, each of which includes a front leg with a front wheel mounted at the lower end thereof and a rear leg with a rear wheel at the lower end thereof;
- a seat arranged between the left and right side bracket;
- a left armrest and right armrest, each front end of which is connected pivotally to the upper part of the left rear leg and the right rear leg respectively and each rear end of which is pivotally connected to the left handle bar and the right handle bar respectively;
- wherein the left/right front leg and the left/right rear leg crosses and connects pivotally to each other at the crossing part, and the left/right handle bars is connected pivotally with the upper part of the left/right front legs.

In the baby pushchair according to the present invention, below the pivotally connecting part of the left/right front leg and the left/right rear leg a basket frame rod substantially arranged horizontally may be pivotally connected to the left/right front leg. A left/right connecting rod may be pivotally connected to the basket frame rod at one end thereof and to the left/right side bracket at the other end thereof.

One end of the connecting rod is pivotally connected to the basket frame rod before the pivotally connecting part of the basket frame rod and the left/right front leg, and the other end is pivotally connected to the front part of the left/right armrest rod or the upper part of the left/right rear leg or is pivotally and coaxially connected to the front part of the left/right armrest rod and the upper part of the left/right rear leg.

In the baby pushchair according to the present invention, alternatively, one end of the connecting rod may be pivotally connected to the basket frame rod behind the pivotally connecting part of the basket frame rod and the left/right front leg, and the other end may be pivotally connected to the left/right rear leg at the lower part below the pivotally connecting part of the left/right front leg and the left/right rear leg.

In the baby pushchair according to the present invention, a tilted backing rod may be pivotally connected with the rear part of the basket frame rod.

DETAILED DESCRIPTION OF THE PREFERRED EMBODIMENTS

The present invention will be further described in conjunction with the accompanying drawings.

Embodiment 1

Figure 1:
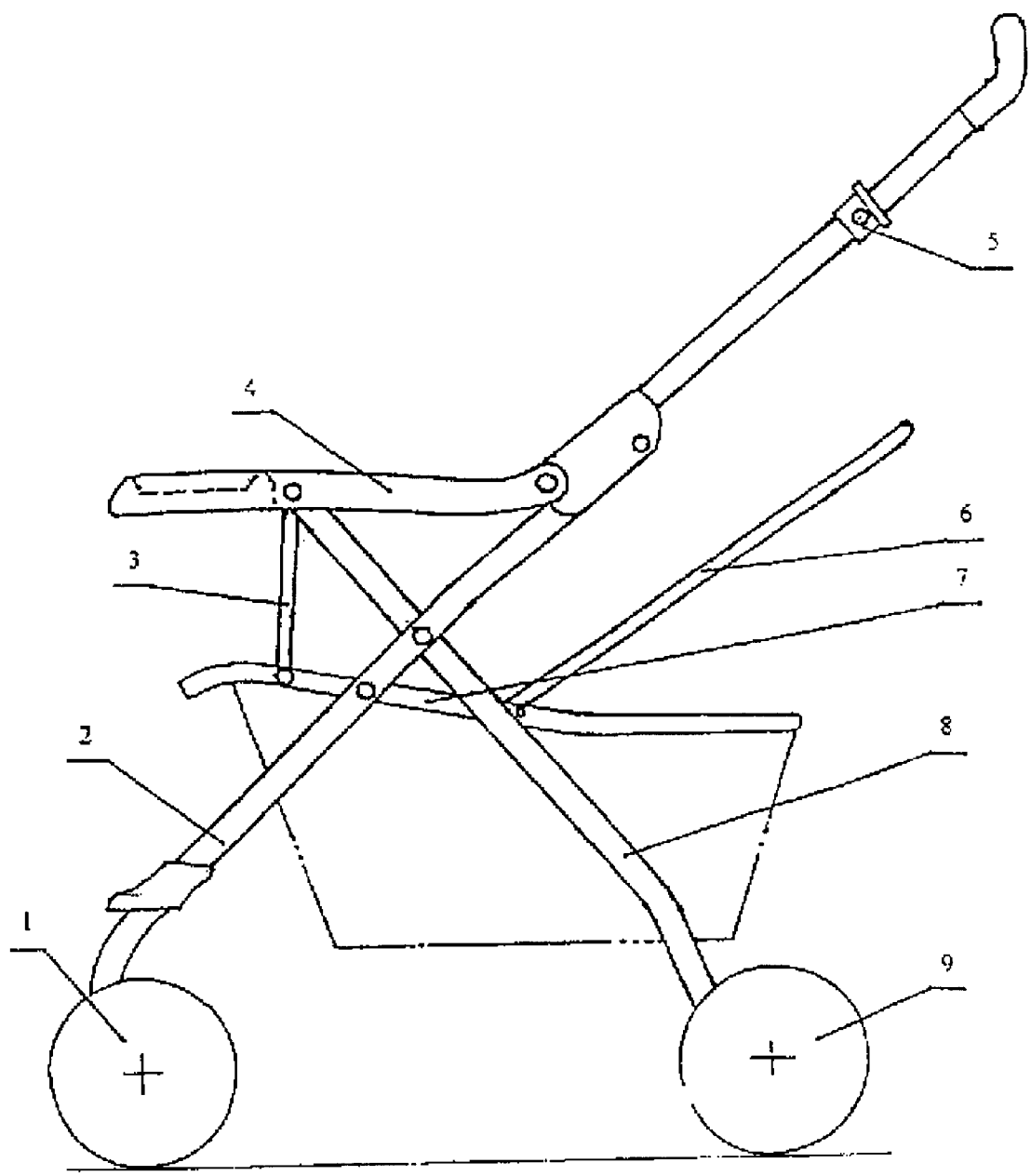
FIG. 1 shows a front view of the right side structure of a baby pushchair according to a preferred embodiment of the present invention while the two side brackets are unfolded.
Figure 2:
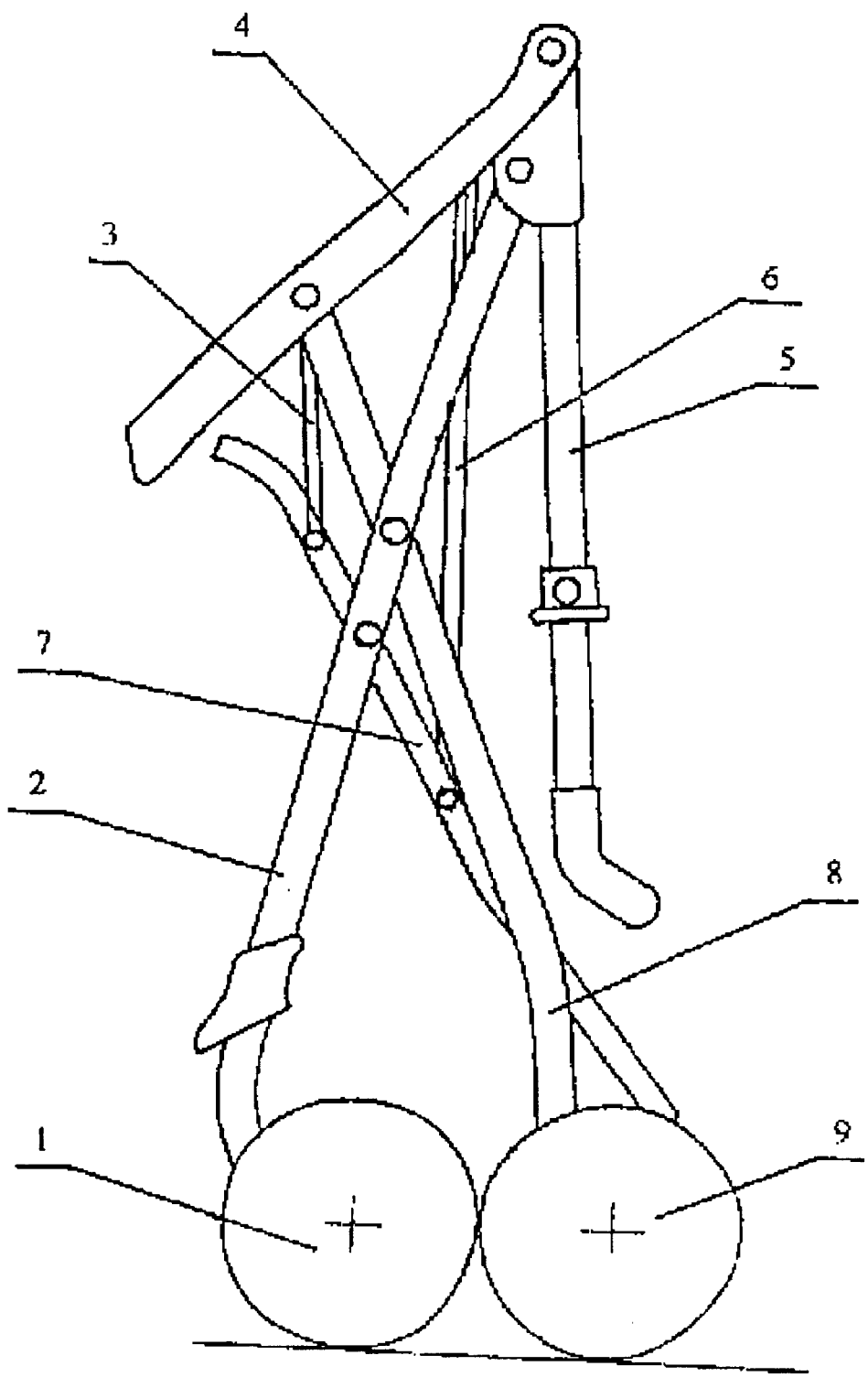
FIG. 2 shows a front view of the right side structure of a baby pushchair according to a preferred embodiment of the present invention while the two side brackets are folded.
Figure 3:
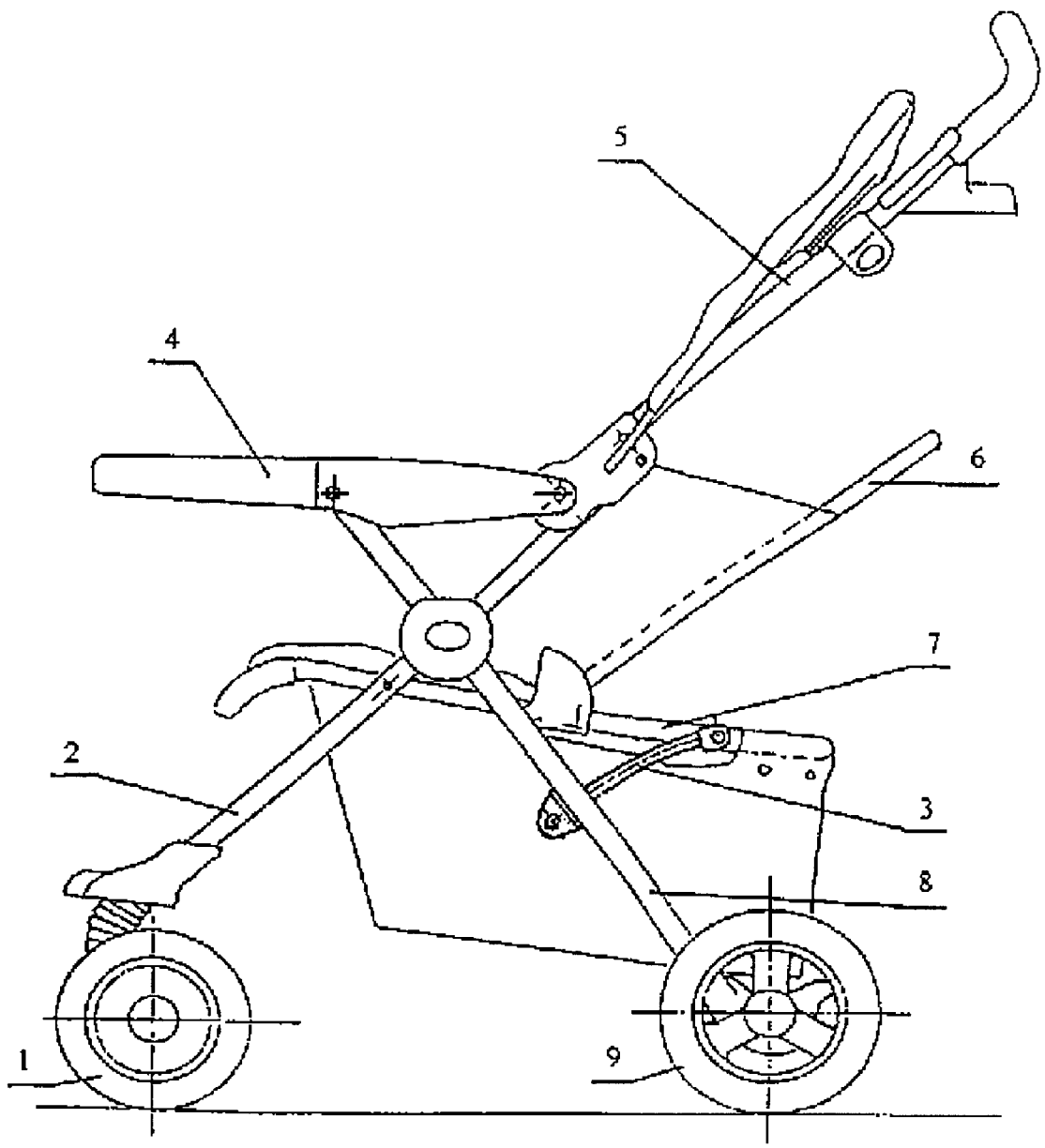
FIG. 3 shows a front view of the right side structure of a baby pushchair according to another preferred embodiment of the present invention while the two side brackets are unfolded.

As shown in FIGS. 1 through 4, a baby pushchair in the embodiments according to the present invention comprises a left side bracket and a right side bracket, two connecting rods for connecting the two side brackets and a seat arranged between the two brackets for allowing a baby to sit or lie down. The right side bracket, as shown in FIG. 1 or 3, comprises a right front leg 2, a right front wheel 1 mounted on the lower end of the right front leg 2, a right rear leg 8, a right rear wheel 9 mounted on the lower end of the right rear leg 8. The right front leg 2 and the right rear leg 8 cross each other and thus form a pivotal connection at the crossing part, with the upper part of the right rear leg 8 connecting pivotally with the front part of a right armrest rod 4. The lower part of a right handle bar 5 pivotally connects to the rear end part of the right armrest rod 4 and the upper part of the right leg 2, respectively. Below the pivotally connecting part of the right front leg 2 and the right rear leg 8 a basket frame rod 7 substantially arranged horizontally is pivotally connected to the right front leg 2. A right connecting rod 3 is pivotally connected to the basket frame rod 7 at one end thereof and to the right side bracket at the other end thereof.

Refer to FIGS. 1 and 2, one end of the right connecting rod 3 is pivotally connected to the basket frame rod 7 before the pivotally connecting part of the basket frame rod 7 and the right front leg 2, and the other end is pivotally connected to the front part of the right armrest bar 4 or the upper part of the right rear leg 8. Alternatively, according to FIG. 1, it can be seen that the other end of the right connecting rod 3 may also pivotally and coaxially connects to the front part of the right armrest bar 4 and the upper part of the right rear leg 8.

Embodiment 2

Figure 4:
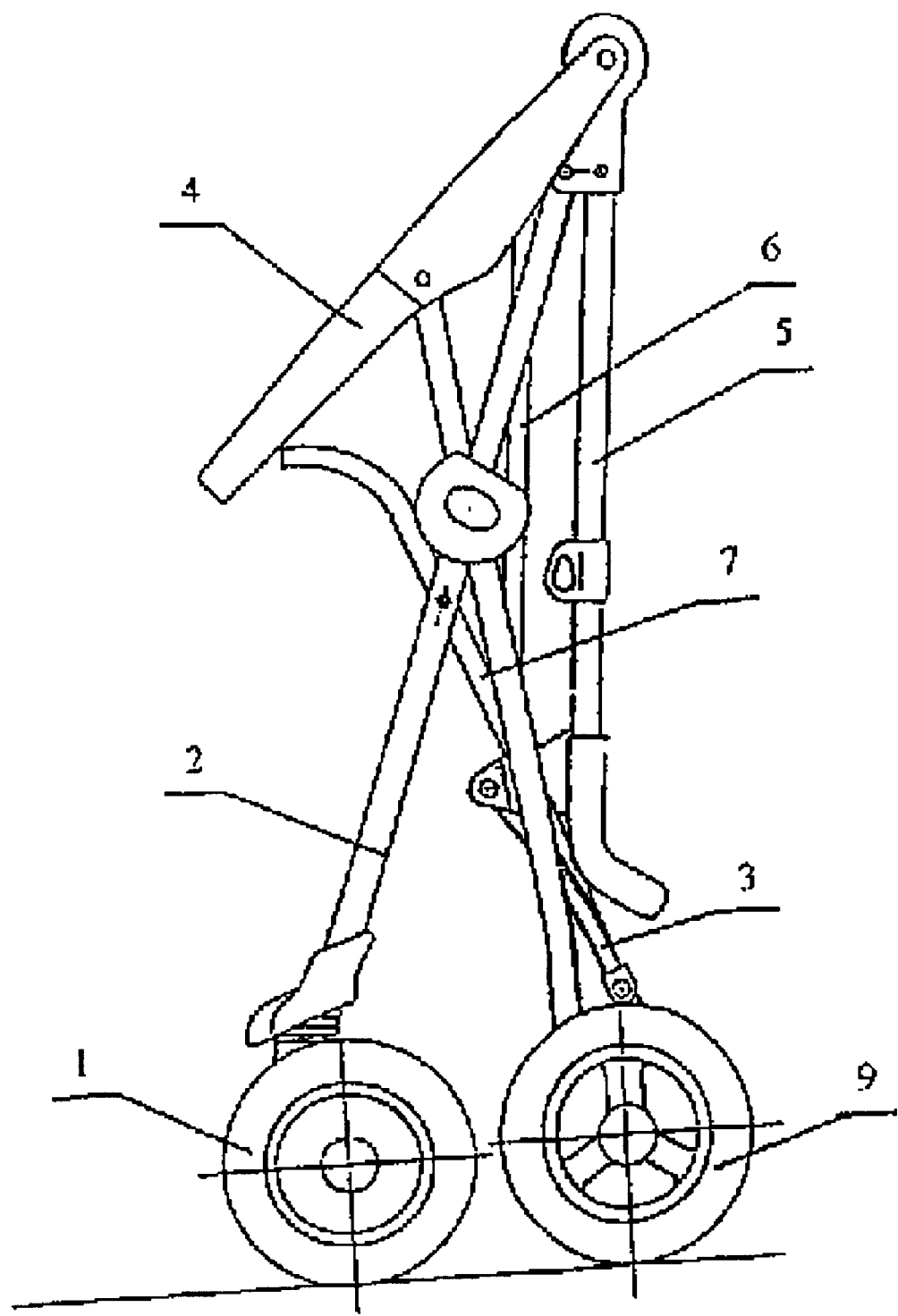
FIG. 4 shows a front view of the right side structure of a baby pushchair according to another preferred embodiment of the present invention while the two side brackets are folded.

FIGS. 3 and 4 show another preferred embodiment of the present invention, where all parts are the same with what are described in the embodiment 1 with the exception that one end of the right connecting rod 3 is pivotally connected to the basket frame rod 7 behind the pivotally connecting part of the basket frame rod 7 and the right front leg 2, and the other end is pivotally connected to the right rear leg 8 at the lower part below the pivotally connecting part of the right front leg 2 and the right rear leg 8.

Though what is shown in FIGS. 1 and 3 and described in the description is only the right side of a baby pushchair according the present invention, the structure of the left side is symmetric and similar to the right side and therefore omitted. The left side and right side of a baby pushchair according to the present invention may be connected together by means of a horizontal-connecting rod or a cross jackstay. The baby pushchair of the present invention is a common pushchair, if the left and right side bracket are connected by a horizontal-connecting rod and the left handle bar and the right handle bar are in the shape of "U". The baby pushchair of the present invention is an umbrella-handle type pushchair if the left and right side bracket are connected by a cross jackstay and the two side brackets are not connected. In the umbrella-handle type pushchair, a tilted backing rod 6 is pivotally connected with the rear part of the basket frame rod 7 on which a basket is suspended, as shown in FIG. 3.

The present invention has the following advantages over the prior art:

(1) Upon folding, the front wheel and the rear wheel form cooperatively a support to the whole pushchair such that the baby pushchair can stand itself.

(2) The numbers of the connecting rods or members are lessened to bring a simple structure and decrease the cost of production.

I claim:

1. A baby pushchair, comprises:

a left handle bar and a right handle bar;

a left side bracket and right side bracket arranged symmetrically, each of which includes a front leg with a front wheel mounted at the lower end thereof and a rear leg with a rear wheel at the lower end thereof;

a seat arranged between the left and right side bracket;

a left armrest and right armrest, each front end of which is connected pivotally to the upper part of the left rear leg and the right rear leg respectively and each rear end of which is connected pivotally to the left handle bar and the right handle bar respectively;

wherein the left/right front leg and the left/right rear leg crosses and connects pivotally to each other at a pivoting crossing point, and the left/right handle bars is connected pivotally with the upper part of the left/right front legs wherein below the pivoting crossing point of the left/right front leg and the left/right rear leg a basket frame rod substantially arranged horizontally is pivotally connected to the left/right front leg, a left/right connecting rod is pivotally connected to the basket frame rod at one end thereof and to the left/right side brackets at the other end thereof;

wherein the left/right connecting rod includes a first end pivotally connected to the basket frame rod before the pivotally connecting part of the basket frame rod and the left/right front leg, and the left/right connecting rod includes an opposite second end pivotally connected to the front part of the left/right armrest rod or the upper part of the left/right rear leg.

2. The baby pushchair of claim 1, wherein the left/right connecting rod is pivotally and coaxially connected to the front part of the left/right armrest rod and the upper part of the left/right rear leg.

3. The baby pushchair of claim 1, wherein the baby pushchair includes a folded condition and an unfolded condition, and when said baby pushchair is in the folded condition the front wheel and the rear wheel cooperatively support the baby pushchair in an upright position.

* * * * *